(12) United States Patent
Kramer

(10) Patent No.: US 7,196,034 B1
(45) Date of Patent: Mar. 27, 2007

(54) NICKEL-IRON-SILICA-ALUMINA

(75) Inventor: Lucas Laurentius Kramer, Kamerik (NL)

(73) Assignee: Engelhard Corporation, Iselin, NJ (US)

( * ) Notice: Subject to any disclaimer, the term of this patent is extended or adjusted under 35 U.S.C. 154(b) by 492 days.

(21) Appl. No.: 10/130,367

(22) PCT Filed: Nov. 17, 2000

(86) PCT No.: PCT/NL00/00844

§ 371 (c)(1),
(2), (4) Date: Sep. 25, 2002

(87) PCT Pub. No.: WO01/36093

PCT Pub. Date: May 25, 2001

(30) Foreign Application Priority Data

Nov. 19, 1999 (EP) .................................. 99203876

(51) Int. Cl.
*B01J 21/00* (2006.01)
*B01J 23/56* (2006.01)
*C10G 45/00* (2006.01)
*C10G 17/00* (2006.01)
*C07C 5/00* (2006.01)

(52) U.S. Cl. .................. 502/325; 502/240; 502/252; 502/258; 502/259; 502/263; 502/332; 502/335; 502/336; 502/337; 502/338; 208/142; 208/143; 208/144; 208/208 R; 208/209; 208/213; 208/217; 208/254 H; 208/262.1; 585/250; 585/256; 585/270; 585/276

(58) Field of Classification Search .............. 502/240, 502/258, 252, 259, 263, 325, 332, 335–338; 208/142–144, 208 R, 209, 213, 217, 254 H, 208/262.1; 585/250, 256, 270, 276
See application file for complete search history.

(56) References Cited

U.S. PATENT DOCUMENTS

| | | | | |
|---|---|---|---|---|
| 3,040,009 A | * | 6/1962 | Wadsworth et al. | 525/339 |
| 3,926,583 A | * | 12/1975 | Rostrup-Nielsen | 48/127.7 |
| 3,944,503 A | * | 3/1976 | Suto et al. | 502/219 |
| 4,134,856 A | * | 1/1979 | Itoh et al. | 502/66 |
| 4,160,745 A | * | 7/1979 | Murrell et al. | 502/185 |
| 4,532,351 A | * | 7/1985 | Barnett et al. | 564/415 |
| 4,592,829 A | * | 6/1986 | Eberly, Jr. | 208/89 |
| 4,837,193 A | * | 6/1989 | Akizuki et al. | 502/242 |
| 4,956,328 A | * | 9/1990 | Frohning et al. | 502/242 |
| 4,992,157 A | * | 2/1991 | Bricker et al. | 208/12 |
| 5,171,793 A | * | 12/1992 | Johnson et al. | 525/332.1 |
| 5,356,847 A | * | 10/1994 | Henderson | 502/84 |
| 5,944,983 A | * | 8/1999 | Hayashi et al. | 208/264 |
| 6,063,265 A | * | 5/2000 | Chiyoda et al. | 208/216 R |
| 6,267,874 B1 | * | 7/2001 | Iijima et al. | 208/217 |
| 6,399,530 B1 | * | 6/2002 | Chen et al. | 502/64 |

FOREIGN PATENT DOCUMENTS

| | | | |
|---|---|---|---|
| EP | 1 101 530 | * | 5/2001 |
| JP | 07-323226 | * | 12/1995 |

* cited by examiner

*Primary Examiner*—J. A. Lorengo
*Assistant Examiner*—Patricia L. Hailey
(74) *Attorney, Agent, or Firm*—Weingarten, Schurgin, Gagnebin & Lebovici LLP

(57) ABSTRACT

The invention is directed to a catalyst suitable for the hydrogenation of hydrocarbon resins, comprising a supported nickel on silica and alumina catalyst, said catalyst having a nickel content of 45 to 85 wt. %, a silicon content, calculated as $SiO_2$, of 14 to 45 wt. %, an aluminium content, calculated as $Al_2O_3$, of 1 to 15 wt. % an iron content, calculated as Fe, 0.25 to 4 wt. %, all percentages having been calculated on the basis of the reduced catalyst, and which catalyst has a volume of pores between 2 and 60 nm, as defined herein, of at least 0.35 ml/g of catalyst.

16 Claims, No Drawings

NICKEL-IRON-SILICA-ALUMINA

The invention relates to a catalyst for hydrogenating hydrocarbon resins. Hydrocarbon resins are produced by oligomerisation or polymerisation of hydrocarbon fractions, typically originating from the (catalytic) cracking of crude, including petroleum distillates and fractions from naphtha crackers, and tend to contain impurities, including so-called color bodies, and other impurities including sulfur compounds, nitrogen compounds, chlorine compounds and/or fluorine compounds. In order to give the resins the required properties (chemical and physical), they are usually hydrogenated using conventional hydrogenation catalysts, such as nickel or precious metal catalysts.

The hydrogenation step can be used to modify various properties of the hydrocarbon resin depending on the properties of the resin to be hydrogenated and the requirements put on the final resin. Examples of these modifications are removal of part or all of the aromatic moieties, removal of so-called color bodies (i.e. decolorizing the resin from yellow to colorless), modification of the molecular weight distribution (decrease of average molecular weight) and removal of impurities, such as sulfur, nitrogen and/or halogen compounds.

Typical prior art nickel hydrogenation catalysts tend to have a very low activity in the molecular weight modification at mild reaction conditions.

Accordingly there is a need for a catalyst and process wherein it is possible to obtain good catalytic activity in hydrogenation of hydrocarbon resins, providing a good balance of properties. Further there is a need for a catalyst that makes it possible to steer the balance of properties of the resulting hydrogenated hydrocarbon resin in terms of molecular weight and/or color and/or chemical composition, in dependence of the wish of the end user and/or the original composition of the hydrocarbon resin, while maintaining good activity of the catalyst, or even improving it.

Accordingly it is an object of the invention to provide a catalyst and process for the hydrogenation of hydrocarbon resins, wherein these advantages are obtained. A further object is to provide a process for the preparation of such a catalyst.

The invention provides a catalyst suitable for the hydrogenation of hydrocarbon resins, comprising a supported nickel on silica and alumina catalyst, said catalyst having a nickel content of 45 to 85 wt. %, a silicon content, calculated as $SiO_2$, of 14 to 45 wt. %, an aluminium content, calculated as $Al_2O_3$, of 1 to 15 wt. % an iron content, calculated as Fe, 0.25 to 4 wt. %, all percentages having been calculated on the basis of the reduced catalyst, and which catalyst has a volume of pores between 2 and 60 nm, as defined herein, of at least 0.35 ml/g of catalyst.

Surprisingly it has been found that this catalyst provides a good hydrogenation of hydrocarbon resins, both in terms of activity and in the possibility of steering the properties of the hydrocarbon resin in order to obtain useful properties in the hydrogenated resin.

Surprisingly it has been found that with the catalyst of the present invention, among others characterized by the specific support material, active components and pore distribution, it is possible to steer the cracking behavior of the catalyst. In case magnesium is present in the catalyst, the cracking is suppressed, whereas without magnesium the catalyst shows good cracking behavior, without sacrificing the activity. This is quite surprising, as with other catalysts this influence of the presence or absence of magnesium is not found (or to a much lesser degree). The magnesium is present in the catalyst in amounts of up to 2.5 wt. %, calculated as metal. It is expected that the magnesium will be present as oxide, in view of the chemical properties of magnesium. Accordingly it is a feature of the present invention that by selection of the amount of this compound, the cracking of the resin may be influenced and as a consequence the average molecular weight of the resulting resin.

The catalyst of the present invention has a total pore volume (cylindrical pores, nitrogen adsorption pore diameters of 2 to 60 nm) of at least 0.35 ml/g of catalyst.

To determine the total pore volume an accurately weighed sample is degassed in a special sample vessel under vacuum at a temperature of 105–220° C. in order to remove adsorbed vapors from the surface. Subsequently the sample vessel is immersed in a liquid nitrogen bath, causing adsorption and condensation of nitrogen, which is introduced in small known quantities, using the Quantachrome Autosorb-6. A preferred upper limit for the said pore volume is 1.5 ml/g.

The recording of the adsorption isotherm is followed by the recording of the desorption isotherm by removing the nitrogen in small known quantities. The desorption isotherm is utilized to calculate the nitrogen pore volume distribution using the BJH-method.

The Loose Apparent Bulk Density (LABD, is the density of powder, measured in 100 ml cylindrical measuring flask after 10 minutes settling without any external force) is preferably less than 0.30 g/ml The nickel content of the catalyst, based on the weight of the reduced catalyst is between 45 and 85 wt. %, with a preference for a value between 55 and 75 wt. %. Within these ranges the optimum for activity and selectivity is obtained. The support material is a combination of silica and alumina. This may be a mixture of the two components, but is also possible that the silicon and aluminium ions are at least partly in the same crystal lattice.

The catalyst according to the invention can be prepared by various methods, such as impregnation of the active components on a preformed silica and alumina containing support, or precipitation on the said support.

It is, however, preferred to prepare the supported catalyst by coprecipitation. This comprises precipitating the catalyst components (catalyst precursor) from solutions of nickel salt, iron salt, aluminium salt and silicon compound, and optional other components, usually by raising or maintaining the pH above about 7.0 by adding a lye, urea, or by electrochemical means. Usual techniques may be applied herein, such as adding all solutions at the same time to the precipitation vessel, or providing one or more components therein and adding the others to the vessel.

The present invention is accordingly also directed to a process for preparing a supported nickel on silica and alumina catalyst, said catalyst having a nickel content of 45 to 85 wt. %, a silicon content, calculated as $SiO_2$, of 14 to 45 wt. %, an aluminium content, calculated as $Al_2O_3$, of 1 to 15 wt. % an iron content, calculated as Fe, 0.25 to 4 wt. %, all percentages having been calculated on the basis of the reduced catalyst, and which catalyst has a volume of pores between 2 and 60 nm, as defined herein, of at least 0.35 ml/g of catalyst, said process comprising coprecipitating the catalyst components at a pH-value of at least 7.0, but preferably below 9.0, recovering the coprecipitated material from the precipitation liquid, washing it and further treating it to produce the catalyst.

The precipitate is subsequently filtered off, washed and further treated as need be. This may include calcination, reduction and passivation. In case magnesium is present in the catalyst this may be included in the solution from which the catalyst is precipitated.

In the present invention various hydrocarbon resin feedstocks may be used. A general definition of hydrocarbon resins has been given in ISO 472, namely products produced by polymerization from coal tar, petroleum and turpentine feedstocks. Preferred are petroleum distillates, resins, and the like. It is possible to use these feedstocks directly, but it is also possible to use the product from a previous hydrodesulfurisation process, i.e a feedstock having a reduced sulfur content, for example in the range of up to 500 ppm, preferably up to 300 ppm.

The process according to the invention comprises hydrogenating the hydrocarbon resin using the catalyst described above. Suitable temperatures and pressures are based on the properties of the resin, the properties required of the end-product and the actual composition and structure of the catalyst. Suitable temperatures are between 100 and 350° C., with a preference for temperatures between 250 and 325° C.; partial hydrogen pressures can be between 1 and 150 bar (abs), and the hydrogenation time is mainly dependent on the temperature, amount of catalyst and required degree of hydrogenation of the resin.

The process is preferably carried out in batch, wherein the catalyst is dispersed in the hydrocarbon resin as powder. Suitable particle sizes of powder are between 1 and 1000 μm. The consumption of fresh catalyst in the process is usually between 0.25 and 4 wt. % relative to the resin.

The process can be carried out in various reactors suitable for slurry hydrogenation, such as stirred tank reactors (optionally cascaded) or loop reactors.

Use of the catalyst as described above results in a hydrogenation of hydrocarbon resins to a product having a carefully balanced set of properties, both chemically and physically. At the same time the hydrogenation results in a decrease of the amount of impurities in the final product.

The present invention is now elucidated on the basis of the following example.

EXAMPLES

Example 1

Solutions containing nickel and magnesium salts, silicate and sodium carbonate were mixed in a well stirred precipitation vessel at a temperature of 80° C.

The pH of the slurry formed was about 7.5 and after 1 hour the precipitation was completed.

After washing the precipitate, the precursor of the catalyst was filtered and dried in an oven at 110° C. The catalyst was activated at with hydrogen.

The composition and the physical properties of the resulting catalyst are specified in table 1.

Example 2

Solutions containing nickel and iron(III) salts, silicate, aluminate and sodium carbonate were mixed in a well stirred precipitation vessel at a temperature of 80° C. The pH of the slurry formed was about 7.5 and after 1 hour the precipitation was completed.

After washing the precipitate, the precursor of the catalyst was filtered and dried in an oven at 110° C. The catalyst was activated with hydrogen.

The composition and the physical properties of the resulting catalyst are specified in table 1.

Example 3

Solutions containing nickel, iron(III) and magnesium salts, silicate, aluminate and sodium carbonate were mixed in a well stirred precipitation vessel at a temperature of 80° C.

The pH of the slurry formed was about 7.5 and after 1 hour the precipitation was completed.

After washing the precipitate, the precursor of the catalyst was filtered and dried in an oven at 110° C. The catalyst was activated with hydrogen.

The composition and the physical properties of the resulting catalyst are specified in table 1.

Example 4

500 g of a 50 wt % hydrocarbon resin (containing 75 ppm S compounds) solution in Shellsol D40 mixed with 3.75 grams of a nickel catalyst was heated in a 1 liter autoclave under 2 bars hydrogen and agitated at 1400 rpm.

As soon as a temperature reached 275° C., the hydrogen pressure was increased to 90 bar. The subsequent hydrogenation process was monitored by recording the hydrogen consumption. The activity of the catalyst on resin hydrogenation, is expressed as the reaction rate constant, obtained from linear regression between 40% and 70% conversion. At 70% conversion the resin mixture is filtered and the molecular weight distribution is determined by means of GPC. The cracking level can be expressed as the reduction of the average molecular weight compared to the original resin feed.

The catalysts described in example 1, 2 and 3 were subject to the above described activity test. The results of these tests are specified in table 1.

TABLE 1

| | | Example 1 | Example 2 | Example 3 |
|---|---|---|---|---|
| Ni | Wt. % | 62 | 62 | 60 |
| Mg | Wt. % | 2.8 | 0 | 2.0 |
| Fe | Wt. % | 0 | 1.5 | 0.8 |
| $SiO_2$ | Wt. % | 11 | 22 | 18 |
| $Al_2O_3$ | Wt. % | 0 | 3.1 | 3.0 |
| Pore Volume (2–60 nm) | ml/g | 0.30 | 0.66 | 0.45 |
| LABD | g/ml | 0.32 | 0.21 | 0.29 |
| Reaction rate constant Resin hydrogenation | mol $H_2$/h/h | 2.0 | 6.1 | 5.8 |
| Reduction of average Molecular weight | % | 3 | 16 | 0 |

The invention claimed is:

1. Catalyst suitable for the hydrogenation of hydrocarbon resins, comprising a supported nickel on a combination silica and alumina catalyst, said catalyst having a nickel content of 45 to 85 wt. %, a silicon content, calculated as $SiO_2$, of 14 to 45 wt. %, an aluminium content, calculated as $Al_2O_3$, of 1 to 15 wt. % an iron content, calculated as Fe, 0.25 to 4 wt. %, all percentages having been calculated on the basis of the reduced catalyst, and which catalyst is a coprecipitated catalyst with volume of pores between 2 and 60 nm of at least 0.35 ml/g of catalyst.

2. Catalyst according to claim 1, wherein additionally up to 2.5 wt. % magnesium, at least partly in the form of oxide is present in the catalyst.

3. Catalyst according to claim 2, wherein the nickel content is between 55 and 75 wt. % of the reduced catalyst.

4. Process for the hydrogenation of hydrocarbon resins in the presence of a supported nickel catalyst, wherein the hydrogenation is performed in the presence of the catalyst according to claim 2.

5. Catalyst according to claim 2, wherein
the nickel content is between 55 and 75 wt. % of the reduced catalyst.

6. Process for the hydrogenation of hydrocarbon resins in the presence of a supported nickel catalyst, wherein the hydrogenation is performed in the presence of the catalyst according to claim 5 wherein:
the color bodies present in the resin are hydrogenated;
the molecular weight distribution of the resin is influenced by the composition of the catalyst;
sulfur, halogen and/or nitrogen impurities are at least partly removed from the resin.

7. Catalyst according to claim 1, wherein the nickel content is between 55 and 75 wt. % of the reduced catalyst.

8. Process for the hydrogenation of hydrocarbon resins in the presence of a supported nickel catalyst, wherein the hydrogenation is performed in the presence of the catalyst according to claim 7.

9. Process for the hydrogenation of hydrocarbon resins in the presence of a supported nickel catalyst, wherein the hydrogenation is performed in the presence of the catalyst according to claim 1.

10. Process according to claim 9, wherein the color bodies present in the resin are hydrogenated.

11. Process according to claim 10 wherein the molecular weight distribution of the resin is influenced by the composition of the catalyst.

12. Process according to claim 10, wherein sulfur, halogen and/or nitrogen impurities are at least partly removed from the resin.

13. Process according to claim 9, wherein the molecular weight distribution of the resin is influenced by the composition of the catalyst.

14. Process according to claim 13, wherein sulfur, halogen and/or nitrogen impurities are at least partly removed from the resin.

15. Process according to claim 9, wherein sulfur, halogen and/or nitrogen impurities are at least partly removed from the resin.

16. Process for the preparation of a supported nickel on silica and alumina catalyst, said catalyst having a nickel content of 45 to 85 wt. %, a silicon content, calculated as $SiO_2$, of 14 to 45 wt. %, an aluminium content, calculated as $Al_2O_3$, of 1 to 15 wt. % an iron content, calculated as Fe, 0.25 to 4 wt. %, all percentages having been calculated on the basis of the reduced catalyst, and which catalyst has a volume of pores between 2 and 60 mm of at least 0.35 ml/g of Catalyst, which process comprises coprecipitating the catalyst components at a pH-value of at least 7.0, recovering the coprecipitated material from the precipitation liquid, washing it and further treating it to produce the catalyst.

* * * * *

UNITED STATES PATENT AND TRADEMARK OFFICE
CERTIFICATE OF CORRECTION

PATENT NO. : 7,196,034 B1
APPLICATION NO. : 10/130367
DATED : March 27, 2007
INVENTOR(S) : Lucas L. Kramer Page 1 of 1

It is certified that error appears in the above-identified patent and that said Letters Patent is hereby corrected as shown below:

Column 4, claim 1, line 66, "with volume" should read --with a volume--;

Column 5, claim 4, line 9, "claim 2" should read --claim 1--;

Column 5, claim 9, line 31, "claim 1" should read --claim 2--;

Column 6, claim 10, line 1, "claim 9" should read --claim 4--;

Column 6, claim 11, line 3, "claim 10" should read --claim 4--;

Column 6, claim 12, line 6, "claim 10" should read --claim 4--;

Column 6, claim 13, line 9, "claim 9" should read --claim 10--;

Column 6, claim 14, line 12, "claim 13" should read --claim 10--;

Column 6, claim 15, line 15, "claim 9" should read --claim 11--; and

Column 6, claim 16, line 25, "mm" should read --nm--.

Signed and Sealed this

Fourteenth Day of April, 2009

JOHN DOLL
*Acting Director of the United States Patent and Trademark Office*